(12) United States Patent
Gore et al.

(10) Patent No.: US 11,038,874 B2
(45) Date of Patent: Jun. 15, 2021

(54) AUTHENTICATION AND AUTHORIZATION OF USERS IN AN INFORMATION HANDLING SYSTEM BETWEEN BASEBOARD MANAGEMENT CONTROLLER AND HOST OPERATING SYSTEM USERS

(71) Applicant: DELL PRODUCTS, L.P., Round Rock, TX (US)

(72) Inventors: Santosh Gore, Bangalore (IN); Chandrasekhar Puthillate, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 349 days.

(21) Appl. No.: 16/004,484

(22) Filed: Jun. 11, 2018

(65) Prior Publication Data
US 2019/0379656 A1 Dec. 12, 2019

(51) Int. Cl.
*H04L 29/06* (2006.01)
(52) U.S. Cl.
CPC .............................. *H04L 63/0853* (2013.01)
(58) Field of Classification Search
CPC .................. H04L 63/0815; H04L 63/0853
USPC ........................................................ 726/6
See application file for complete search history.

(56) References Cited

U.S. PATENT DOCUMENTS

| | | | |
|---|---|---|---|
| 8,898,349 B1* | 11/2014 | Mondal | G06F 13/385 710/16 |
| 9,147,086 B1* | 9/2015 | Potlapally | G06F 21/64 |
| 2005/0182843 A1* | 8/2005 | Reistad | H04L 41/0233 709/230 |
| 2012/0254289 A1* | 10/2012 | Sathish | G06Q 30/0631 709/203 |
| 2017/0070498 A1 | 3/2017 | Fork et al. | |
| 2017/0134373 A1* | 5/2017 | Li | H04L 63/061 |
| 2018/0041604 A1 | 2/2018 | Poblete et al. | |
| 2018/0054422 A1 | 2/2018 | Rahardjo et al. | |
| 2019/0095593 A1* | 3/2019 | Cisneros | H04L 9/0825 |
| 2019/0379656 A1* | 12/2019 | Gore | H04L 63/0815 |
| 2020/0053080 A1* | 2/2020 | Hamlin | H04L 63/083 |

OTHER PUBLICATIONS

Management Component Transport Protocol (MCTP) KCS Transport Binding Specification Document No. DSP0254 (Year: 2010).*

\* cited by examiner

*Primary Examiner* — Benjamin A Kaplan
(74) *Attorney, Agent, or Firm* — Isidore PLLC

(57) ABSTRACT

A method, an information handling system (IHS), and an authentication system for authenticating users of an IHS. The method includes receiving, from a client computer system, a request to access at least one authentication domain of the IHS. The method further includes transmitting a request for an authentication token to a baseboard management controller (BMC) and receiving the authentication token from the BMC. The method further includes generating, via a processor, an application session using the authentication token and the client credentials and transmitting the application session to the client computer system. The application session allows access by the client computer system to the authentication domain of the IHS.

20 Claims, 5 Drawing Sheets

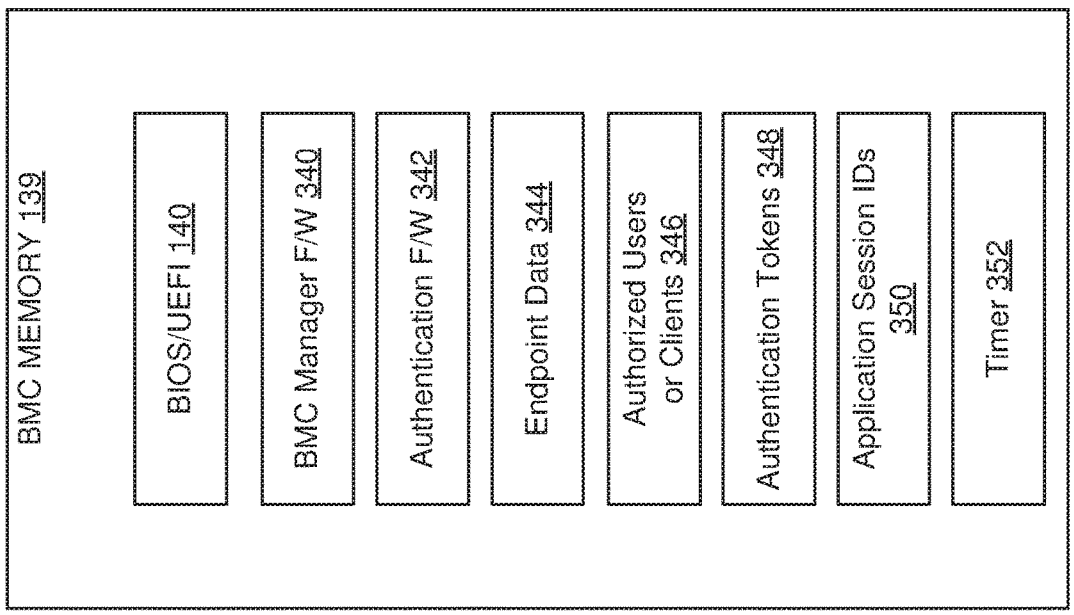
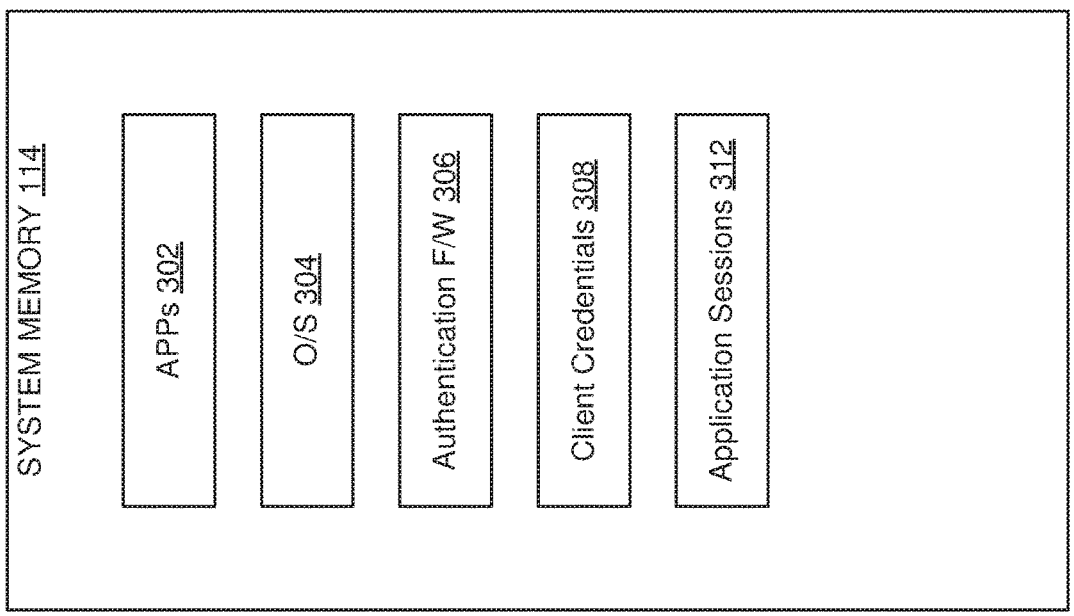
FIG. 3B
FIG. 3A

AUTHENTICATION AND AUTHORIZATION OF USERS IN AN INFORMATION HANDLING SYSTEM BETWEEN BASEBOARD MANAGEMENT CONTROLLER AND HOST OPERATING SYSTEM USERS

BACKGROUND

1. Technical Field

The present disclosure generally relates to information handling systems and in particular to authenticating users of an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Information handling systems can have multiple connected systems such as multiple computers or servers. The information handling systems can restrict user access based on access criteria defined by a system administrator. For example, a user may be permitted to log into one server, but may not be permitted access to another server. Unfortunately, when multiple connected computers and servers are used in an information handling system, it is difficult to provide access to all of the systems because each of the systems requires a separate set of credentials to allow user access.

BRIEF SUMMARY

Disclosed are a method, an information handling system (IHS), and an authentication system for authenticating users of an IHS.

According to one embodiment, the method includes receiving, from a client computer system, a request to access at least one authentication domain of the IHS. The method further includes transmitting a request for an authentication token to a baseboard management controller (BMC) and receiving the authentication token from the BMC. The method further includes generating, via a processor, an application session using the authentication token and the client credentials and transmitting the application session to the client computer system. The application session allows access by the client computer system to the authentication domain of the IHS.

According to another embodiment, the IHS includes a processor communicatively coupled to a memory device and a baseboard management controller (BMC). A client computer system is communicatively coupled to the processor. The processor has firmware executing thereon for performing authentication in/of the IHS. The firmware configures the processor to receive, from the client computer system, a request to access at least one authentication domain of the IHS. The firmware further configures the processor to transmit a request for an authentication token to the BMC and receive the authentication token from the BMC. The firmware further configures the processor to generate an application session using the authentication token and the client credentials and transmit the application session to the client computer system. The application session allows access by the client computer system to the authentication domain of the IHS.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A illustrates example contents of a system memory in an IHS, in accordance with one embodiment;

FIG. 3B illustrates example contents of a baseboard management controller memory, in accordance with one embodiment;

DETAILED DESCRIPTION

Figure 1:
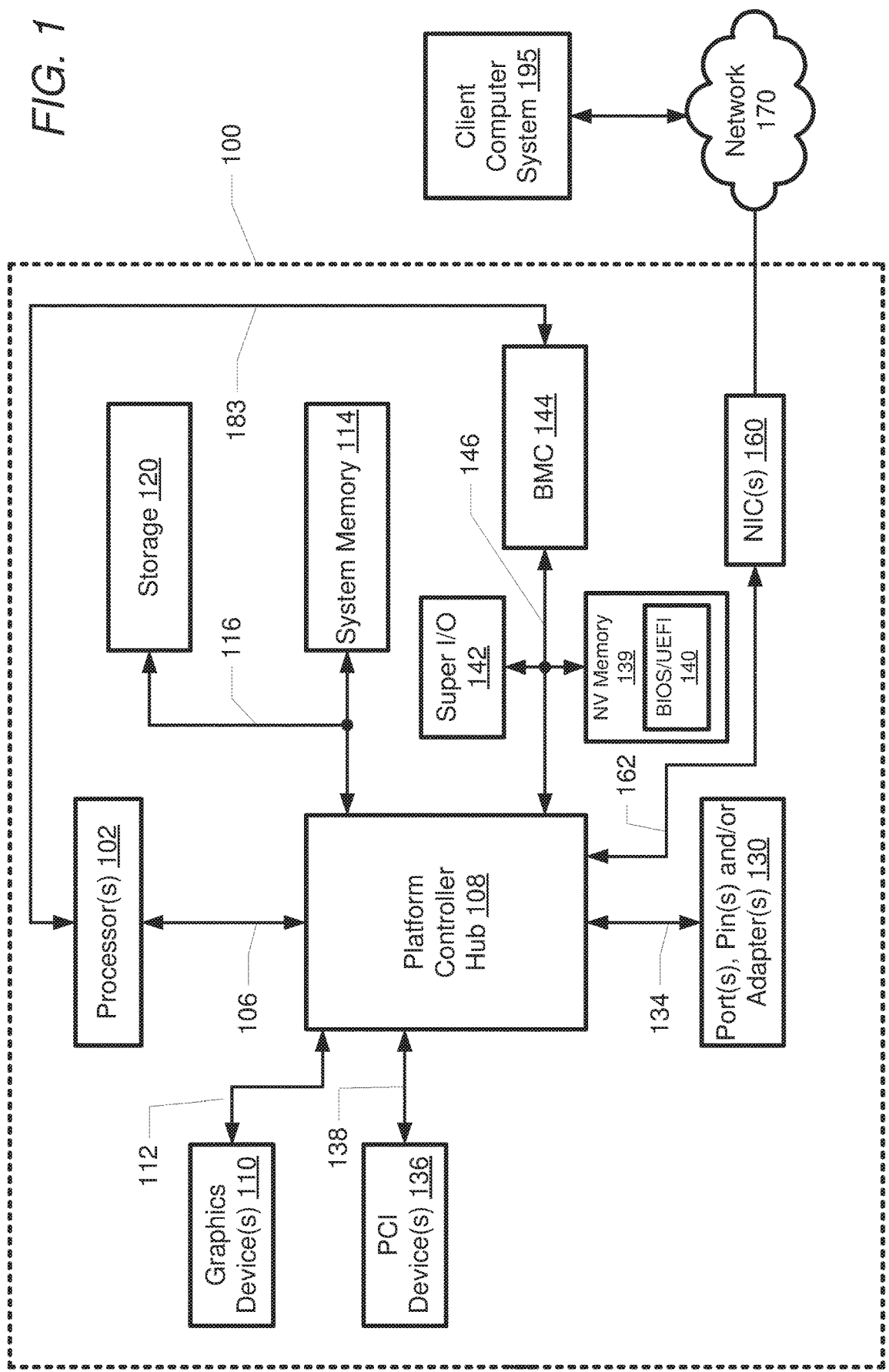
FIG. 1 illustrates one example of an IHS within which various aspects of the disclosure can be implemented, according to one or more embodiments.

The illustrative embodiments provide a method, an information handling system (IHS), and an authentication system for authenticating users of an IHS.

The method includes receiving a request, from a client computer system, to access at least one authentication domain of the IHS. The method further includes transmitting a request for an authentication token to a baseboard management controller (BMC) and receiving the authentication token from the BMC. The method further includes generating, via a processor, an application session using the authentication token and the client credentials and transmitting the application session to the client computer system. The application session allows access by the client computer system to the authentication domain of the IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via memory bus 116. System memory 114 may be configured to store program instructions and/or data accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by memory bus 116 to storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is coupled to a baseboard management controller (BMC) memory 139 via Low Pin Count (LPC) bus 146. BMC memory 139 stores a basic input output system/unified extensible firmware interface (BIOS/UEFI) 140. PCH 108 is also coupled to super I/O Controller 142 and BMC 144 via LPC bus 146.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

IHS 100 further includes a baseboard management controller (BMC) 144 that is in communication with BMC memory 139 that can have program instructions stored thereon that are usable by processors(s) 102 to enable remote management of IHS 100. For example, BMC 144 may enable a user to discover, update, troubleshoot, configure, remediate and manage IHS 100, setup configuration options, resolve and administer hardware or software problems, etc. Additionally or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse and other devices. BMC 144 is also communicatively coupled to processor 102 via I2C bus 183. I2C bus 183 can support a variety of interfaces such as a keyboard controller style (KCS) interface. The KCS interface is a set of bit definitions and register operations. Data is transferred across a KCS interface using a per-byte handshake.

BMC 144 monitors and controls the operation of IHS 100 and other systems and devices communicatively coupled to IHS 100. BMC 144 can also perform configuration and remote control of other connected IHSs. Certain software and/or firmware modules stored in BMC memory 139 can be executed by BMC 144. Processor(s) 102 and BMC 144 include specific firmware that enables processor(s) 102 and BMC 144 to perform the various functions described herein.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface controllers (NIC(s)) 160 coupled to PCH 108 via universal serial bus (USB) 162. NIC(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NIC 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes one or more user or client computer systems 195 that are communicatively coupled to IHS 100 via network 170. Client computer system 195 can request access to resources, services, data and information of IHS 100.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or BMC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

Figure 2:
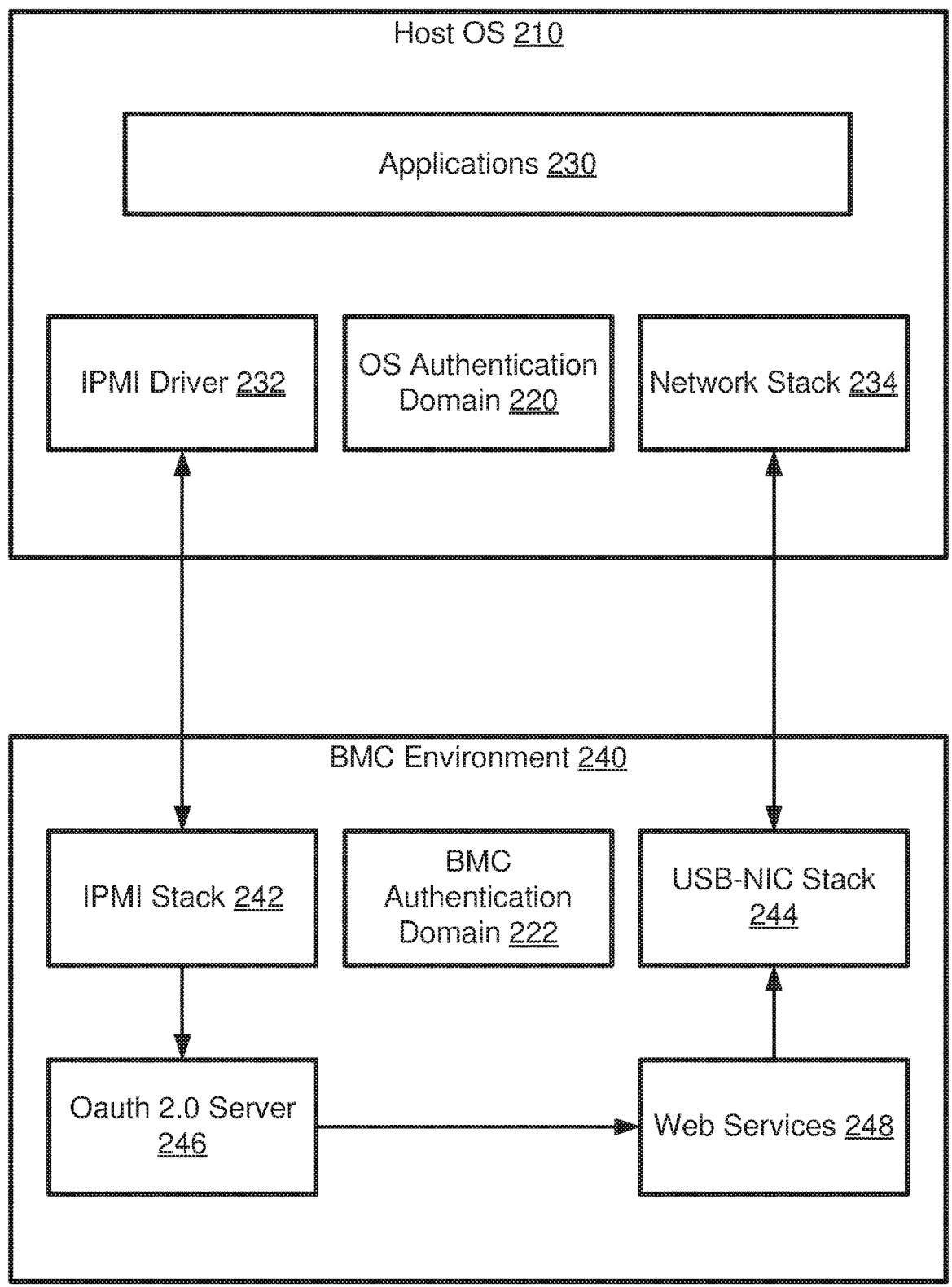
FIG. 2 illustrates a diagrammatic view of an IHS operating system and a baseboard management controller environment, in accordance with one embodiment.

In the description of each of the following figures, reference is also made to specific components illustrated within the preceding figures. With reference now to FIG. 2, one embodiment of a host operating system (OS) 210 associated with IHS 100 and BMC environment 240 associated with BMC 144 are shown. Host OS 210 includes system (OS) authentication domain 220, application(s) 230, intelligent platform management interface (IPMI) driver 232 and network stack 234. BMC environment 240 includes BMC authentication domain 222, IPMI stack 242, USB-NIC stack 244, Oauth 2.0 server 246 and web services 248.

OS authentication domain 220 is a security domain that manages and controls access by clients or users to OS services and resources. BMC authentication domain 222 is a security domain that manages and controls access by clients or users to BMC services and resources. OS authentication domain 220 is a separate security domain from BMC authentication domain 222. For example, some users or clients can have access to OS services and resources, but not to and BMC services and resources. As another example, a user or client can have access to both OS services and resources and to BMC services and resources. A security domain is considered to be an application or collection of applications that trust a security token for authentication, authorization, or session management. In general, a security token is issued to a user or client after the user or client has actively authenticated with a user identification and password to the security domain.

Application(s) 230 are programs that are designed for use by an end user such as a user of client computer system 195. IPMI driver 232 is software interface that provides management and monitoring capabilities independently of the IHS system's CPU, firmware (BIOS or UEFI) and operating system. Network stack 234 is a list of software functions for implementation of computer networking communication protocols used by NIC 160.

IPMI stack 242 is a list of software functions for the implementation of IPMI operations by BMC 144. USB-NIC stack 244 is a list of software functions for the implementation of communications between NIC 160 and BMC 144. Oauth 2.0 server 246 represents access to external server resources via web services 248. Oauth 2.0 server 246 contains openid connect data such as OS username, privilege and application name. Openid connect is an identity layer used with an OAuth 2.0 protocol, which allows verification of the identity of an end user based on the authentication performed by an IHS. The openid connect data also includes basic profile information about the end user in an interoperable and representational state transfer (REST) manner. OAuth is a standard that applications can use to provide client applications with secure delegated access. OAuth works over HTTP and authorizes devices, APIs, servers and applications with access tokens. Web services 248 represent access to resources external to BMC environment 240 and IHS 100 via network 170.

In one embodiment, BMC 144 can communicate with the host OS executing on processor 102 via functions of IPMI stack 242 and IPMI driver 232. BMC 144 can also communicate with the network 170 via functions of USB-NIC stack 244 and network stack driver 234.

With reference now to FIG. 3A, one embodiment of example contents of system memory 114 of IHS 100 is shown. System memory 114 includes data, software, and/or firmware modules, including application(s) 302, operating system (O/S) 304, and authentication firmware (F/W) 306. Authentication F/W 306 performs the processes presented in the flowchart of FIG. 4. System memory 114 further includes client credentials 308 and application sessions 312.

Client credentials 308 are documentation such as a user or client identification and password provided by a user to access multiple authentication domains of IHS 100 and BMC 144 (i.e., authentication domains 220 and 222). In one embodiment, client credentials 308 can include openid connect data such as OS username, privilege and application name. Openid connect is an identity layer used with an OAuth 2.0 protocol, which allows verification of the identity of an end user based on the authentication performed by an IHS. The openid connect data also includes basic profile information about the end user in an interoperable and REST like manner. OAuth is a standard that applications can use to provide client applications with secure delegated access. OAuth works over HTTP and authorizes devices, APIs, servers and applications with access tokens.

Application sessions 312 are an interactive information interchange or dialog between two or more communicating devices such as between client computer system 195 and IHS 100. An application session can be set up or established at a certain point in time and terminated at some later point in time. In one embodiment, application sessions 312 can be representational state transfer (REST) application sessions or graphical user interface (GUI) application sessions. REST is an architectural style that defines a set of constraints and properties based on hypertext transfer protocol (HTTP). Services that conform to the REST architectural style provide interoperability between computer systems. REST compliant services allow requesting computer systems (i.e. client computer system 195) to access and manipulate textual representations of resources by using a uniform and predefined set of stateless operations. System memory 114 can also include other data, software, and/or firmware modules.

Turning to FIG. 3B, one embodiment of example contents of BMC memory 139 of IHS 100 is shown. BMC memory 139 includes BIOS/UEFI 140, BMC manager F/W 340, authentication F/W 342 and endpoint data 344. BMC manager F/W 340, when executed by BMC 144, can control and manage the functions and operation of BMC 144. Authentication firmware F/W 342 performs the processes presented in the flowchart of FIG. 5. Endpoint data 344 includes uniform resource identifier (URI) data that typically refers to the address of some object or set of objects that are exposed at an application programming interface (API) endpoint. In an embodiment, endpoint data 344 can include the IP, communication protocol (HTTP or other protocols) and port information of BMC 144. In one embodiment, endpoint data 344 can be REST endpoint data.

BMC memory 139 further includes authorized user or clients 346, authentication tokens 348, application sessions identifications (IDs) 350 and timer 352. Authorized user or clients 346 contains a list of authorized users or clients that have been granted access to BMC 144. Authorized user or clients 346 can include an OS username and associated privileges and applications.

Authentication tokens 348 are credentials that can be used by a client to access services and resources of application programming interfaces (APIs) of BMC 144. Authentication tokens 348 inform the API that the bearer of the token has been authorized to access the API and perform specific actions. In one embodiment, authentication tokens 348 can be OAuth tokens.

Application sessions IDs 350 are data that are used in network communications to identify application sessions 312. Application sessions IDs 350 are necessary in cases where the communications infrastructure uses a stateless protocol, such as hypertext transfer protocol (HTTP). An application session ID is typically short-lived and expires after a preset period of time. Timer 352 tracks the preset period of time during which application sessions IDs 350 are valid. Upon expiration of timer 352, the application session ID becomes invalid.

In one embodiment, processor 102 receives a request from client computer system 195 to access BMC 144 and the associated BMC authentication domain 222. Processor 102 transmits a request for an authentication token 348 to BMC 144 via a keyboard controller style (KCS) interface and receives the authentication token 348 from the BMC via the KCS interface. Processor 102 generates an application session 312 using the authentication token 348 and transmits the application session 312 to the client computer system 195. The application session allows access by the client computer system to BMC authentication domain 222. In one embodiment, authentication token 348 can allow single sign-on access to both OS authentication domain 220 and BMC authentication domain 222.

Single sign-on allows access to multiple related, yet independent, software systems. A user or client can log into IHS 100 with a single identification and password to gain access to a connected system or systems (i.e., OS authentication domain 220 and BMC authentication domain 222) without using different usernames or passwords, or in some configurations seamlessly sign on at each system. Single sign-off is the property whereby a single action of signing out terminates access to multiple systems.

The use of BMC 144 to generate authentication tokens 348 provides a secure process to authenticate within IHS 100 without the need for a web server. The use of I2C bus 183 with a KCS interface provides a trusted communication connection between processor 102 and BMC 144 that is accessible to administrative users only, thereby enabling secure authentication of both local users of IHS 100 and users external to IHS 100 (i.e., client computing system 195).

Figure 4:
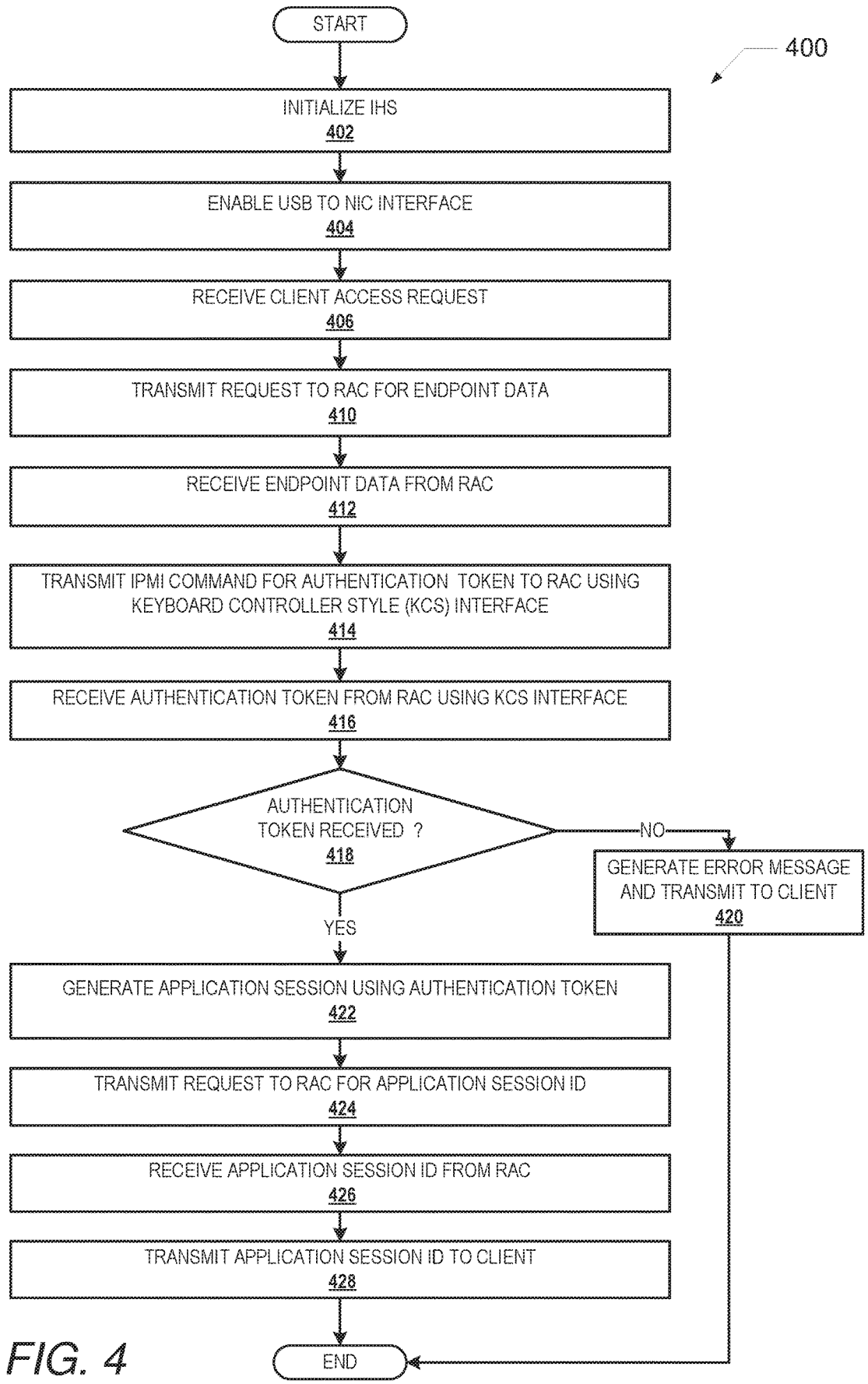
FIG. 4 is a flow chart illustrating one example of a method for authentication in an IHS, according to one or more embodiments.
Figure 5:
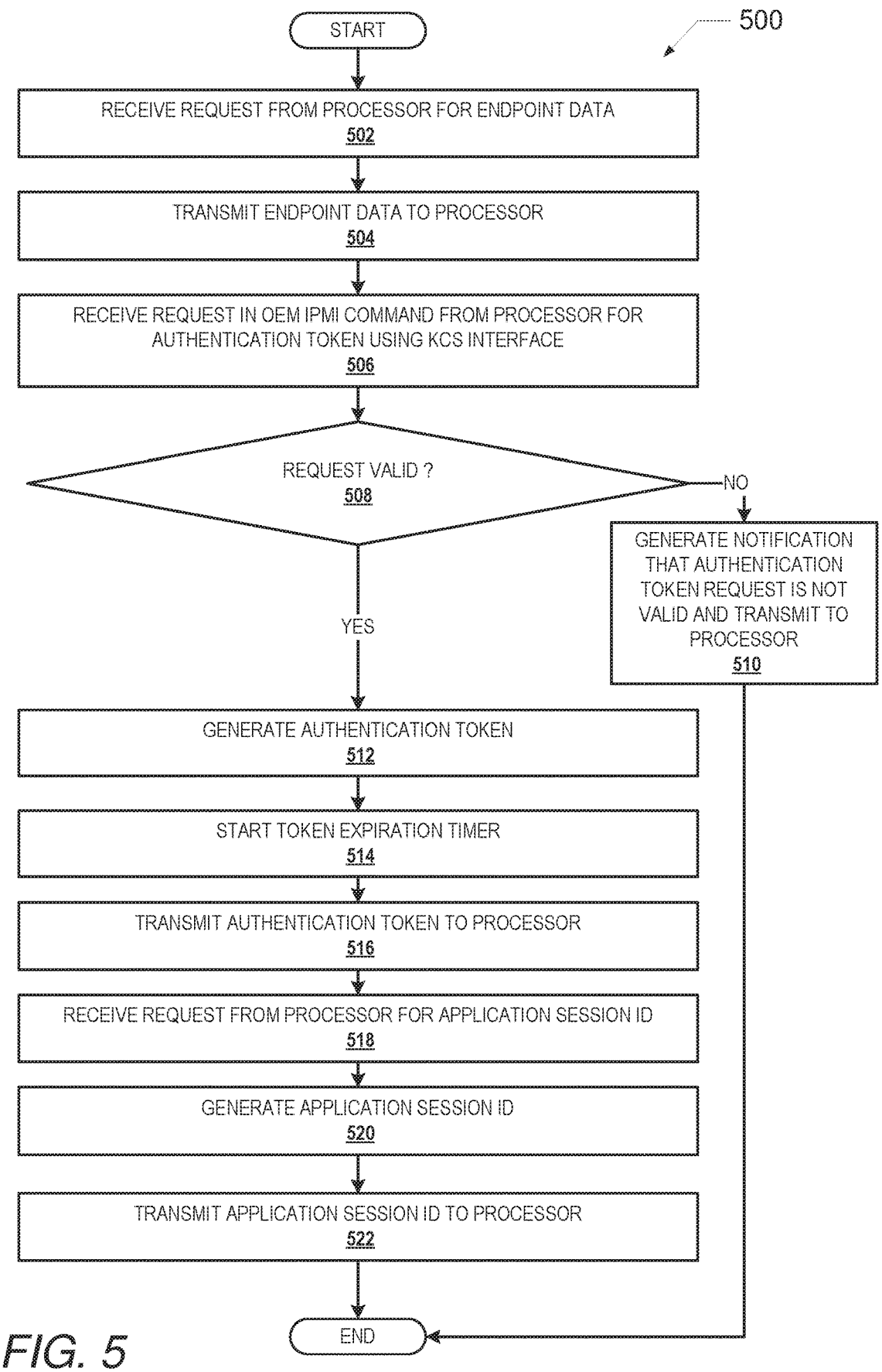
FIG. 5 is a flow chart illustrating another example of a method for authentication in an IHS, according to one or more embodiments.

FIG. 4 illustrates a flowchart of an exemplary method 400 by which processor 102 within the preceding figures performs different aspects of the processes that enable the one or more embodiments of the disclosure. FIG. 5 illustrates a flowchart of an exemplary method 500 by which BMC 144 within the preceding figures performs different aspects of the processes that enable the one or more embodiments of the disclosure. Generally, method 400 represents a method by which IHS 100 authenticates users or clients requesting access to IHS 100. Method 500 represents a method by which BMC 144 authenticates users or clients requesting access to IHS 100.

The description of methods 400 and 500 is provided with general reference to the specific components illustrated within the preceding FIGS. 1-3B. Generally, method 400 is described as being implemented via processor 102 and particularly the execution of code provided by authentication F/W 306 acting within processor 102. Method 500 is described as being implemented via BMC 144 and particularly the execution of code provided by authentication F/W 342 acting within BMC 144. It is however appreciated that certain aspects of the described methods may be implemented via other processing devices and/or execution of other code.

Referring to the flow chart of FIG. 4, method 400 begins at the start block and proceeds to block 402 where processor 102 initializes IHS 100. Initializing of IHS includes booting, loading the OS, and loading of any required drivers. Processor 102 enables a USB to NIC interface via USB 162 (block 404). Processor 102 receives a request to access BMC authentication domain 222 from client computer system 195 (block 406). The request to access the BMC authentication domain can include client credentials 308, such as openid connect data including a username and domain name. In one embodiment, the request is only to access BMC authentication domain 222. In another embodiment, the request can be a single sign-on request to access both IHS 100 and BMC 144 and their respective associated authentication domains 220 and 222. In the single sign-on embodiment, processor 102 can authenticate client access to OS authentication domain 220 separately prior to the execution of method 400.

Processor 102 transmits a request for endpoint data 344 to BMC 144 using an intelligent platform management interface (IPMI) command or a system management basic input output system (SMBIOS) token (block 410) and receives the endpoint data 344 from BMC 144 (block 412). In one embodiment, the transmission request for and receiving of endpoint data can be facilitated by software functions of IPMI driver 232 and IPMI stack 242. Endpoint data 344 contains the address or location to send an authentication token request. In one embodiment, endpoint data 344 can include the IP, communication protocol (e.g., https or other protocol), and port information of BMC 144.

Processor 102 transmits a request for an authentication token 348 to BMC 144 using an IPMI command via I2C bus 183 using a KCS interface (block 414). The request for an authentication token includes at least a portion of client credentials 308 such as parameters required for Openid connect such as OS username, privilege and application name. Processor 102 receives authentication token 348 from BMC 144 via the KCS interface (block 416). In one embodiment, the transmission request for and receiving of authentication tokens can be facilitated by software functions of IPMI driver 232 and IPMI stack 242. In one embodiment, BMC 144 can access Oauth 2.0 server 246 via network 170 to obtain an authentication token 238.

Processor 102 determines if the authentication token 348 has been received from BMC 144 (decision block 418). In response to determining that the authentication token 348 has not been received, processor 102 generates an error message and transmits the error message to client computer system 195 (block 420). Method 400 then ends. In response to determining that the authentication token 348 has been received, processor 102 generates an application session 312 using the authentication token (block 422). In one embodiment, the application session 312 can be a REST application session or a graphical user interface (GUI) application session. Processor 102 transmits a request for an application session ID 350 associated with application session 312 to BMC 144 (block 424).

Processor 102 receives the application session ID 350 from BMC 144 (block 426).

Application session IDs 350 are received in response to Oauth authentication for HTTP requests (e.g., graphical user interface (GUI), REST, application programming interface (API), etc.) over the USB to NIC interface. The network stack integration is provided by USB drivers executing with host OS 210. Processor 102 transmits the application session ID 350 to client computer system 195 (block 428). Client computer system 195 can use application session ID 350 to validate to BMC 144 that it has authenticated access to BMC 144 each time that client computer system 195 requests access to services or resources of BMC 144. Application session ID 350 is valid until the expiration of timer 352 that is associated with authentication token 348. Method 400 then terminates.

The use of authentication token 348 allows BMC 144 to validate access requests from client computer system 195 during a single sign-on to both OS authentication domain 220 associated with processor 102 and BMC authentication domain 222 associated with BMC 144. The use of authentication token 348 also allows client computer system 195 to access both OS authentication domain 220 associated with processor 102 and BMC authentication domain 222 associated with BMC 144 via a single log-on or sign-on.

Referring to the flow chart of FIG. 5, method 500 begins at the start block and proceeds to block 502 where BMC 144 receives a request for endpoint data 344 from processor 102. BMC 144 transmits endpoint data 344 to processor 102 (block 504). BMC 144 receives a request for an authentication token 348 in an IPMI command via I2C bus 183 using a KCS interface (block 506). In one embodiment, the request for and transmission of endpoint data can be facilitated by software functions of IPMI driver 232 and IPMI stack 242. The request for an authentication token includes at least a portion of client credentials 308 such as parameters required for Openid connect. These parameters can include OS username, privilege, and application name.

At decision block 508, BMC 144 determines if the request for the authentication token is valid. BMC 144 determines if the request for the authentication token is valid by comparing the received user or client credentials such as OS username, privilege, and application name to the list of authorized users or clients 346. If the user or client credentials are a match to an entry within the list of authorized users or clients 346, the request for the authentication token is valid. In response to determining that the request for the authentication token is not valid, BMC 144 generates a notification that the authentication token request is not valid and transmits the notification to processor 102 (block 510). Method 500 then ends.

In response to determining that the request for the authentication token is valid, BMC 144 generates authentication token 348 (block 512) and starts timer 352 (block 514). When timer 352 expires, the authentication token 348 and application session ID 350 are no longer valid. BMC 144 transmits authentication token 348 to processor 102 (block 516). BMC 144 receives a request for an application session ID 350 from processor 102 (block 518). BMC 144 generates application session ID 350 (block 520) and transmits the application session ID 350 to processor 102 (block 522). Method 500 then terminates.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for authentication in an information handling system (IHS), the method comprising:
   receiving, from a client computer system, a first request to access at least one authentication domain of the IHS, the first request comprising client credentials, the at least one authentication domain comprising at least a baseboard management controller (BMC) authentication domain, the BMC authentication domain being a security domain that manages and controls access by clients or users to BMC services and resources, the BMC authentication domain being a separate security domain from an OS authentication domain that manages and controls access by clients or users to OS services and resources;
   in response to receiving the first request, transmitting, via a processor, a second request for an authentication token to the BMC, the second request transmitted using an intelligent platform management interface (IPMI) command via I2C bus using a keyboard controller style (KCS) interface;
   receiving the authentication token from the BMC;
   generating, via the processor, an application session using the authentication token and the client credentials; and
   transmitting the application session to the client computer system, the application session allowing access by the client computer system to the at least one authentication domain of the IHS.

2. The method of claim 1, wherein receiving the authentication token from the BMC is via the KCS interface.

3. The method of claim 1, wherein the operating system (OS) authentication domain is associated with the processor and the BMC authentication domain is associated with the BMC.

4. The method of claim 1, further comprising:
   transmitting a request for an application session identification associated with the application session to the BMC;
   receiving the application session identification from the BMC; and
   transmitting the application session identification to the client computer system.

5. The method of claim 1, further comprising:
   determining if the authentication token has been received from the BMC;
   in response to determining that the authentication token has not been received, generating an error message; and
   transmitting the error message to the client computer system.

6. The method of claim 1, further comprising:
   receiving, via the BMC, a request for the authentication token from the processor;
   determining if the request for the authentication token is valid by comparing received user or client credentials to a list of authorized users or clients and identifying the authentication token as valis in response to the user or client credentials being a match to an entry within the list of authorized users or clients;
   in response to determining that the request for the authentication token is valid, generating the authentication token; and
   transmitting the authentication token to the processor.

7. The method of claim 1, further comprising:
   transmitting a request to the BMC for endpoint data; and
   receiving the endpoint data from the BMC, the endpoint data comprising contains an address or location to send an authentication token request; and
   generating, utilizing the endpoint data, an intelligent platform management interface (IPMI) command to request the authentication token .

8. An information handling system (IHS) comprising:
   a processor communicatively coupled to a memory device and a baseboard management controller (BMC);
   a client computer system communicatively coupled to the processor, the processor having firmware executing thereon for authentication in the IHS, wherein the firmware configures the processor to:
      receive, from a client computer system, a first request to access at least one authentication domain of the IHS, the first request comprising client credentials, the at least one authentication domain comprising at least a BMC authentication domain, the BMC authentication domain being a security domain that manages and controls access by clients or users to BMC services and resources, the BMC authentication domain being a separate security domain from an OS authentication domain that manages and controls access by clients or users to OS services and resources;
      in response to receiving the first request, transmit a second request for an authentication token to the BMC, the second request transmitted using an intelligent platform management interface (IPMI) command via I2C bus using a keyboard controller style (KCS) interface;
      receive the authentication token from the BMC;
      generate an application session using the authentication token and the client credentials; and
      transmit the application session to the client computer system, the application session allowing access by the client computer system to the at least one authentication domain of the IHS.

9. The information handling system of claim 8, wherein receiving the authentication token from the BMC is via the KCS interface.

10. The information handling system of claim 8, wherein the operating system (OS) authentication domain is associated with the processor and the BMC authentication domain is associated with the BMC.

11. The information handling system of claim 8, wherein the firmware further configures the processor to:
- transmit a request for an application session identification associated with the application session to the BMC;
- receive the application session identification from the BMC; and
- transmit the application session identification to the client computer system.

12. The information handling system of claim 8, wherein the firmware further configures the processor to:
- determine if the authentication token has been received;
- in response to determining that the authentication token has not been received, generate an error message; and
- transmit the error message to the client computer system.

13. The information handling system of claim 8, wherein the firmware further configures the processor to:
- receive, via the BMC, a request for the authentication token from the processor;
- determine if the request for the authentication token is valid by comparing received user or client credentials to a list of authorized users or clients and identifying the authentication token as valis in response to the user or client credentials being a match to an entry within the list of authorized users or clients;
- in response to determining that the request for the authentication token is valid, generate the authentication token; and
- transmit the authentication token to the processor.

14. The information handling system of claim 8, wherein the firmware further configures the processor to:
- transmit a request to the BMC for endpoint data; and
- receive the endpoint data from the BMC; and
- generate an intelligent platform management interface (IPMI) command to request the authorization token.

15. An authentication system for authenticating a user of an information handling system (IHS), the authentication system comprising:
- a processor communicatively coupled to a memory device and a baseboard management controller (BMC);
- a client computer system communicatively coupled to the processor, the processor having firmware executing thereon for authenticating the user of the IHS, wherein the firmware configures the processor to:
  - receive, from the client computer system, a first request to access at least one authentication domain of the IHS, the first request comprising client credentials, the at least one authentication domain comprising at least a baseboard management controller (BMC) authentication domain, the BMC authentication domain being a security domain that manages and controls access by clients or users to BMC services and resources, the BMC authentication domain being a separate security domain from an OS authentication domain that manages and controls access by clients or users to OS services and resources;
  - in response to receiving the first request, transmit a second request for an authentication token to the BMC, the second request transmitted using an intelligent platform management interface (IPMI) command via I2C bus using a keyboard controller style (KCS) interface;
  - receive the authentication token from the BMC;
  - generate an application session using the authentication token and the client credentials; and
  - transmit the application session to the client computer system, the application session allowing access by the client computer system to the at least one authentication domain of the IHS.

16. The authentication system of claim 15, wherein receiving the authentication token from the BMC is via the KCS interface.

17. The authentication system of claim 15, wherein the operating system (OS) authentication domain is associated with the processor and the BMC authentication domain is associated with the BMC.

18. The authentication system of claim 15, wherein the firmware further configures the processor to:
- transmit a request for an application session identification associated with the application session to the BMC;
- receive the application session identification from the BMC; and
- transmit the application session identification to the client computer system.

19. The authentication system of claim 15, wherein the firmware further configures the processor to:
- determine if the authentication token has been received;
- in response to determining that the authentication token has not been received, generate an error message; and
- transmit the error message to the client computer system.

20. The authentication system of claim 15, wherein the firmware further configures the processor to:
- receive, via the BMC, a request for the authentication token from the processor;
- determine if the request for the authentication token is valid by comparing received user or client credentials to a list of authorized users or clients and identifying the authentication token as valis in response to the user or client credentials being a match to an entry within the list of authorized users or clients;
- in response to determining that the request for the authentication token is valid, generate the authentication token; and
- transmit the authentication token to the processor.

* * * * *